March 11, 1969   J. J. FITZGERALD ET AL   3,432,386
METHOD OF PRODUCING A THULIUM HEAT SOURCE MATERIAL
Filed Dec. 2, 1966

INVENTORS
JOSEPH J. FITZGERALD
KENNETH E. MAYO

BY

ATTORNEY

United States Patent Office 3,432,386
Patented Mar. 11, 1969

3,432,386
METHOD OF PRODUCING A THULIUM HEAT SOURCE MATERIAL
Joseph J. Fitzgerald, Winchester, Mass., and Kenneth E. Mayo, Nashua, N.H., assignors to Sanders Nuclear Corporation, Nashua, N.H., a corporation of Delaware
Filed Dec. 2, 1966, Ser. No. 598,841
U.S. Cl. 176—16                     8 Claims
Int. Cl. G21g 1/02

ABSTRACT OF THE DISCLOSURE

The invention relates to an economical method of producing thulium 171 with a high ratio of thulium 171 to thulium 170. The method comprises irradiating thulium 169 in a high flux neutron reactor to produce a mixture of radioactive isotopes comprising thulium 170 and thulium 171. The mixture formed is then allowed to decay. Due to the considerably longer half life of thulium 171, the ratio of thulium 171 to thulium 170 in the mixture increases. After a preselected decay time, decay products can be separated leaving a high purity thulium 171 thermal source.

---

Figure 1:
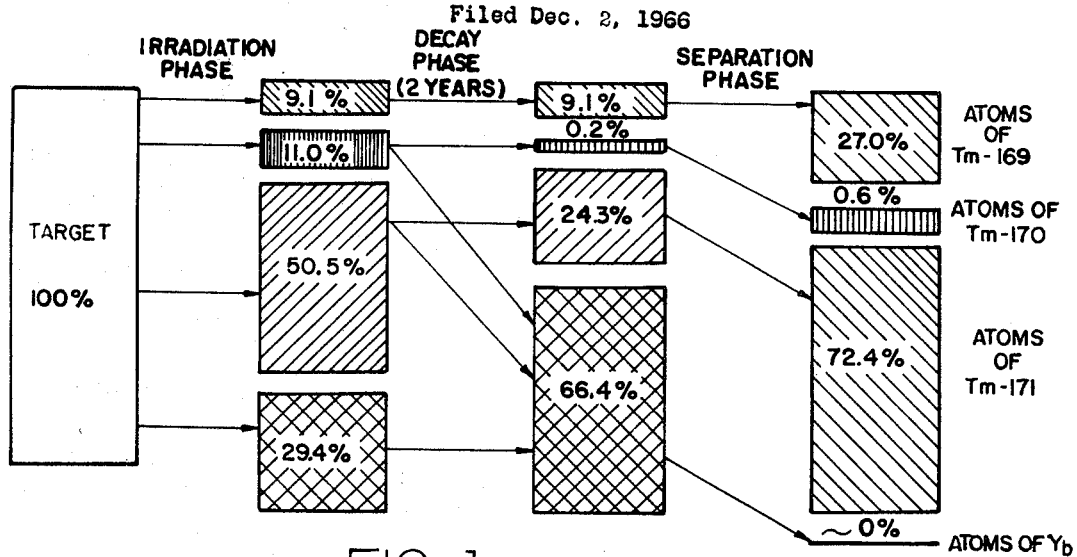

There has been an increasing demand for radioactive heat sources for energy purposes as for use in the power, medical and space fields. Heretofore, very little consideration was given to thulium as an isotopic-power source for a variety of reasons including the difficulty of producing thulium 171 at high purity levels in large quantities and the high cost of such production by any heretofore known methods. Both thulium 170 and thulium 171 isotopes have been known and are normally produced by different, expensive methods. For example, thulium 169 is used as a target for thulium 170 production and erbium 170 has been used as a target for production of thulium 171. Production of thulium 171 directly from a thulium 169 target as by burn through of the target to form thulium 170 and then thulium 171 has often led to mixtures of the two products which are difficult to separate, thus preventing economical production of high purity thulium 171. As a result of these problems, thulium 171 is not ordinarily considered as heat source material as is promethium 147 and plutonium 238.

An important object of this invention is to provide a method for producing thulium 171 in large quantities at low cost with high purity levels equal or better than the purity levels of currently available promethium 147 and plutonium 238 with respect to shielding required for equivalent dose rates.

Another object of this invention is to provide a method in accordance with the preceding object which allows production of high purity thulium 171 utilizing conventional nuclear reactors operating at economic neutron flux levels.

According to the invention thulium 171 is produced with high purity utilizing a starting or target material of thulium 169. The thulium 169 is irradiated in a nuclear reactor at high neutron flux levels for a preselected time to produce a mixture of thulium 169, thulium 170, thulium 171 and ytterbium. The mixture produced in the reactor is preferably removed from the reactor and permitted to decay for a second preselected time period. This decay period has been found to be significant in purifying the reaction products obtained from the nuclear reactor since Tm 170 has a half life of 127 days while Tm 171 has a half life of 1.9 years. Thus, the Tm 170 produced decays at a much faster rate than the Tm 171. By preselecting the time of decay, one can allow the mixture taken from the reactor to decay to a point where the ratio of atomic percentage of thulium 171 to thulium 170 in the mixture is significantly higher than the starting ratio. After the decay period, separation steps are preferably performed to separate the small amount of thulium 170 remaining along with thulium 171 and remaining thulium 169 target from the decay products of ytterbium. The separation of the ytterbium is relatively easy as compared to any attempts hithertofore known to separate thulium 170 from thulium 171. The resultant product after the separation step is a high purity thulium isotopic power source material.

It is a feature of this invention that the process can be economically carried out as compared with production of known isotopic power sources and as compared with other methods of producing thulium 171 at high purity levels for use as an isotopic power source.

Figure 2:
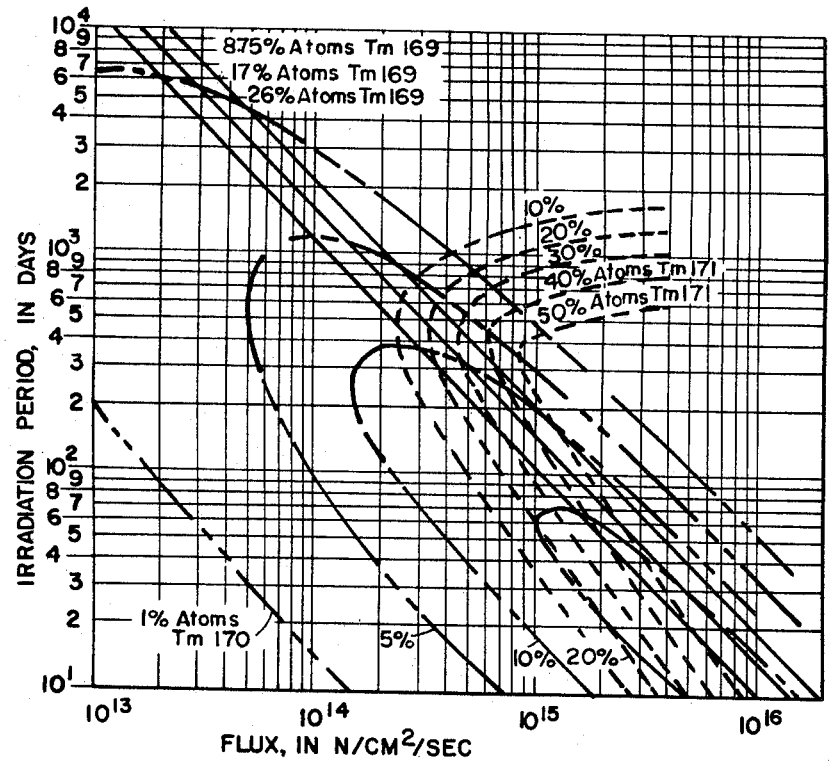

The above and other objects, features and advantages of the invention will be better understood from the following specification when read in connection with the accompanying drawings in which:

FIG. 1 is a diagrammatic flow chart representation of the method of this invention; and, FIG. 2 is a graph showing the relationship of neutron flux and time required for production or radioactive isotopes of thulium from thulium 169.

The starting material used as a target in a conventional nuclear reactor in accordance with the present invention is thulium 169. The thulium 169 can be in its pure metallic form although thulium oxide is preferably used. The metal has a low melting point, compatability problems and poor adaptabilty and flexibility for most heat source applications. Moreover, the metal appears to undergo a lattice change in decay from thulium to ytterbium which also causes problems when used as a target material. On the other hand, thulium 169 prepared as thulium oxide $Tm_2O_3$ is practical and technically feasible for use, at least in part, because of its high melting temperature, high density form, compatability with encapsulants and stable lattice structures in decay to ytterbium. Thulium 169 is the only stable isotope of thulium (100% abundant) and has a thermal neutron cross section (approximately 118 barns) which assures sufficient activation to thulium 170 which has a thermal neutron cross section (approximately 150 barns) which assures sufficient activation to thulium 171 under economically obtainable neutron flux levels and times.

The thulium or thulium oxide can be used as a target material in powder form or in sintered wafer forms which are preferred for some applications. For example, thulium oxide can be compressed and sintered under heat and pressure conditions into vitrified wafers, the specific dimensions of which are determined at least in part by the particular ultimate power or radiation level desired for a particular application. A typical wafer could, for example, have a thickness of from 1 to 5 mm. and a diameter of from ½ to 3 inches. Preferably the thulium oxide is compressed to as near to its theoretical density as possible to increase ultimate power output density since the maximum power per unit dimension is a function of thulium density. It has been found desirable to compress the thulium oxide to a density of at least 80% of its theoretical maximum density and preferably to a range of from 90 to 95% of theoretical density.

The irradiation step can be carried out in a conventional nuclear reactor or more preferably in a high flux reactor such as a Savannah River reactor preferably with the use of carbon disc spacers between wafers of thulium oxide with the carbon of discs having approximate dimensions equal to that of the dimensions of the thulium oxide wafers.

Preferably the thulium 169 is irradiated at neutron flux levels of from about $10^{14}$ to about $10^{16}$ n/cm.$^2$/sec. for periods of time in the range of from about 2 years to about 10 days. The graph shown at FIG. 2 indicates the atomic percentage of thulium 169, thulium 170, thulium 171 which will be in a thulium 169 target irradiated for a given period of time at a given reactor neutron flux. The curves are based on neutron absorption cross sections of 125 barns for thulium 169, 150 barns for thulium 170, and 0 barns for thulium 171, ytterbium 170 and ytterbium 171. While it is known that there are slight variations in these cross sectional values, they can be used within the required accuracy of the method of this invention. There may be a resonant cross section for making thulium 171 from thulium 170 which could substantially increase the production of thulium 171 and thus further enhance the effectivenes of the process.

One can immediately tell from the curves shown in FIG. 2 what relative atomic percentages of thulium 169, thulium 170 and thulium 171 will be in a thulium 169 oxide target irradiated for the times and at the levels indicated. A slight variation of the curves apply for irradiation of thulium 169 when thulium metal rather than thulium oxide is used as the target material but the curves are substantially the same and can be considered equivalent. Thus, the curves can be used to carry out the irradiation step and determine the period of decay required to get thulium 171 at the desired purity and power density using the method of this invention.

The practical parameters for irradiation time and neutron flux that must be considered in each particular case include the amount of thulium 171 that is required from the target material and the time schedule for delivery of the thulium 171. Thus, it may be desirable to irradiate and burn through to a large percentage thulium 171 before the start of the decay period although this may be more expensive than producing lower initial amounts of thulium 171 and allowing longer decay times.

The theoretical parameters for selection of irradiation time and neutron flux depend on the accuracy of the cross section data, the possibility of high resonant cross sections in either thulium 169, thulium 170 or thulium 171 and the flux distribution within a given parameter. Thus, as set forth in the preceding paragraph, longer irradiation times and higher fluxes could yield a greater initial ratio of thulium 171 to thulium 170 than indicated and this would require a shorter decay time for a given purity because of the smaller amount of thulium 170 present in the original mixture. In addition, the decay time necesarily used after irradiation is often dictated by the radiation limitations for the particular application in which the final product is used as an isotopic power source. If higher allowable doses are tolerable, larger quantities of thulium 170 can be left in the mixture.

Normally, irradiation times and levels are selected to achieve less than maximum thulium 171 production possible in view of the cost factor. Thus, in most cases, the flux levels and times stated as preferred ranges above would be used although for particular applications, many variations are possible.

A necessary by-product of the neutron irradiation of thulium 169 is the production of ytterbium which can be easily separated from the thulium by known techniques. For example, separation after a period of decay time can be carried out by known chemical separation steps such as ion exchange.

In a specific example illustrating the method of the present invention and following the diagrammatic outline shown in FIG. 1, 50 kilograms of thulium 169 can be irradiated in a nuclear reactor at a flux of $1 \times 10^{15}$ n/cm.$^2$/sec. for a period of 220 days at the end of which time the mixture of atoms (listed in atomic percentages of the mixture) in the original target material would be as follows:

| | Percent |
|---|---|
| Tm 169 | 9.1 |
| Tm 170 | 11 |
| Yb 170 | 23.6 |
| Tm 171 | 50.5 |
| Yb 171 | 5.8 |
| Total Tm | 70.6 |
| Total Yb | 29.4 |

After irradiation, the product can be removed from the reactor and allowed to decay for a period of 2 years at which time the mixture of atoms listed in atomic percentages would be as follows:

| | Percent |
|---|---|
| Tm 169 | 9.1 |
| Tm 170 | 0.2 |
| Yb 170 | 34.4 |
| Tm 171 | 24.3 |
| Yb 171 | 32 |
| Total TM | 33.6 |
| Total Yb | 66.4 |

The ratio of thulium 171 to thulium 170 is substantially increased as compared to the ratio of thulium 171 to thulium 170 after the irradiation phase. After the decay phase is completed, the ytterbium can be separated from the mixture by known ion exchange processes such as by using a presized column containing Ambolite CG–120 Mesh 100–200 (in ion exchange resin). The rare earth mixture is placed in the upper portion of the column where the rare earths in the tri-positive state replace the sodium of the Ambolite. A 5% citrate buffered solution in ammonium hydroxide entering the column at the top selectively picks up the rare earths as a function of the stability of the rare earth citrates and separation is thereby made. The product can then be used in a thermo-electric generator or as a heat source for an artificial heart. The resultant mixture as shown in FIG. 1 comprises relatively pure thulium 171 in admixture with minor amounts of thulium 170 and inactive thulium 169.

The particular period of decay time used after irradiation can be selected as desired but is preferably at least two times the half life of thulium 170. The following chart shows an indication of the $k$ factor of the irradiated mixture of the example after selected decay time intervals (T) following irradiation ($k$=initial power thulium 171 over initial power thulium 170).

| T=0 | T=2 yrs. | T=4 yrs. | T=6 yrs. |
|---|---|---|---|
| 5 kw. (thermal). k=0.074. | 2.5 kw. (thermal). k=2. | 1.25 kw. (thermal). k=64. | 0.625 kw. (thermal). k=2,000. | where kw. (thermal) is the thermal power in kilowatts.

From the above description and the specific example, it will readily be seen by those skilled in the art that thulium 171 can be produced in a highly purified form from thulium 169 to yield a product with high power density at economically feasible cost which is readily useful as an isotopic power source for a variety of specific applications such as thermo-electric generators and other isotopic powered conversion cycles.

While specific embodiments of the present invention have been shown and described, many variations thereof are possible. Therefore, this invention is to be limited only by the spirit and scope of the following claims.

What is claimed is:

1. A method of producing thulium 171 at high purity levels from a starting material comprising thulium 169, said method comprising irradiating said thulium 169 at a high neutron flux level for a preselected time to produce a mixture of thulium 169, thulium 170, thulium 171 and ytterbium, wherein the ratio of atoms of thulium 171 to atoms of thulium 170 is greater than 0.5 to 1,
subsequently permitting said mixture to decay for a second preselected time during which said thulium 170 decays at a more rapid rate than said thulium 171, said second preselected time causing the resultant mixture to have a higher ratio of thulium 171 to thulium 170 than present immediately after said irradiation, and utilizing said thulium 171 after said second preselected time as a nuclear energy source.

2. A method in accordance with the method of claim 1 and further comprising the step of separating said ytterbium from said resulting mixture to increase the power density of said thulium 170 and thulium 171.

3. A method in accordance with the method of claim 1 wherein said flux level is in the range of from $10^{14}$ to $10^{16}$ n/cm.$^2$/sec.

4. A method in accordance with the method of claim 1 wherein said first time is in the range of from 10 days to 2 years.

5. A method in accordance with the method of claim 1 wherein said second time is selected to provide less than 1 atomic percent of thulium 170 in the final product.

6. A method in accordance with the method of claim 2 wherein said ytterbium is separated by passing said resultant mixture through an ion exchange media.

7. A method in accordance with the method of claim 2 wherein said flux level is in the range of from $10^{14}$ to $10^{16}$ n/cm.$^2$/sec.

8. A method in accordance with the method of claim 7 wherein said second time is selected to provide less than 1 atomic percent of thulium 170 in the final product.

References Cited

AEC Document, ORNL–3792, May 1965, pp. 6–10, 17, 18, 24, 25, 45.

AEC Document, DP–1066, vol. 1, May 1966, pp. I–14, I–62, I–63, I–67, I–68.

Nuclear Engineering Handbook, 1958, pp. (11–91)–(11–97), (14–31).

TID–7698 (pt. 1), 1964, pp. 146, 147.

Nuclear Science Abstracts, vol. 16, No. 23, pp. 4154, 4155, No. 31567, December 1962.

Nuclear Science Abstracts, vol. 17, No. 12, p. 2628, June 1963, No. 20104.

BENJAMIN R. PADGETT, *Primary Examiner.*

H. E. BEHREND, *Assistant Examiner.*